United States Patent
Werner et al.

(10) Patent No.: US 12,250,164 B2
(45) Date of Patent: Mar. 11, 2025

(54) METHOD AND TRANSCEIVER OF A WIRELESS COMMUNICATION NETWORK FOR HANDLING REFERENCE SIGNALS

(71) Applicant: Telefonaktiebolaget LM Ericsson (publ), Stockholm (SE)

(72) Inventors: Karl Werner, Segeltorp (SE); Torsten John Carlsson, Lund (SE); Magnus Nilsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/267,558

(22) PCT Filed: Dec. 22, 2020

(86) PCT No.: PCT/SE2020/051256
§ 371 (c)(1),
(2) Date: Jun. 15, 2023

(87) PCT Pub. No.: WO2022/139641
PCT Pub. Date: Jun. 30, 2022

(65) Prior Publication Data
US 2024/0056244 A1 Feb. 15, 2024

(51) Int. Cl.
*H04L 25/02* (2006.01)
*H04L 5/00* (2006.01)

(52) U.S. Cl.
CPC .......... *H04L 5/0023* (2013.01); *H04L 5/0051* (2013.01); *H04L 25/0226* (2013.01)

(58) Field of Classification Search
CPC .. H04L 5/0023; H04L 5/0051; H04L 25/0226
See application file for complete search history.

(56) References Cited

U.S. PATENT DOCUMENTS

| 2019/0045544 A1 | 2/2019 | Wang et al. |
| 2020/0091979 A1 | 3/2020 | Sivasiva Ganesan et al. |

(Continued)

FOREIGN PATENT DOCUMENTS

| JP | 2016517653 A | 6/2016 |
| JP | 2022535368 A | 8/2022 |

(Continued)

OTHER PUBLICATIONS

Author Unknown, "Technical Specification Group Radio Access Network; NR; Physical channels and modulation (Release 16)," Technical Specification 38.211, Version 16.3.0, Sep. 2020, 3GPP Organizational Partners, 133 pages.

(Continued)

*Primary Examiner* — Rahel Guarino
(74) *Attorney, Agent, or Firm* — Withrow & Terranova, PLLC

(57) ABSTRACT

Disclosed is a method and a first transceiver of a wireless communication network, for handling reference signals. The method comprises receiving, from a second transceiver, at antenna elements of each of M antenna branches of the first transceiver and in time domain, an OFDM modulated wideband reference signal comprising an OFDM reference signal symbol mapped to every K subcarrier frequency of at least a subset of a carrier frequency bandwidth, and, at each of the M antenna branches, sampling the received wideband reference signal using N samples per OFDM symbol. The method further comprises, for each of the M antenna branches, accumulating the received, sampled wideband reference signal over at least two repetition blocks, each of length of N/K, to obtain a condensed signal with the length N/K samples and conveying the condensed signal over an interface to an aggregate unit.

17 Claims, 5 Drawing Sheets

(56) References Cited

U.S. PATENT DOCUMENTS

| | | | |
|---|---|---|---|
| 2020/0266944 A1* | 8/2020 | Kakishima | H04L 5/0012 |
| 2020/0295897 A1 | 9/2020 | Grant et al. | |
| 2020/0313932 A1 | 10/2020 | Sun et al. | |
| 2020/0382978 A1 | 12/2020 | Manolakos et al. | |

FOREIGN PATENT DOCUMENTS

| | | |
|---|---|---|
| KR | 20190027314 A | 3/2019 |
| WO | 2019203702 A1 | 10/2019 |
| WO | 2020043310 A1 | 3/2020 |
| WO | 2020242784 A1 | 12/2020 |

OTHER PUBLICATIONS

Ericsson, "R1-1612352: Further discussion on CSI-RS pooling," 3GPP TSG-RAN WG1 #87, Nov. 14-18, 2016, Reno, Nevada, 6 pages.

International Search Report and Written Opinion for International Patent Application No. PCT/SE2020/051256, mailed Oct. 13, 2021, 10 pages.

Request for the Submission of an Opinion for Korean Patent Application No. 10-2023-7012993, mailed Feb. 1, 2024, 7 pages.

Notice of Allowance for Korean Patent Application No. 10-2023-7012993, mailed May 1, 2024, 8 pages.

Ericsson, "R1-1907509: UL Reference Signals for NR Positioning," 3GPP TSG RAN WG1 Meeting #97, May 13-17, 2019, Reno, Nevada, 7 pages.

Huawei, et al., "R1-1908115: SRS design for NR positioning," 3GPP TSG RAN WG1 Meeting #98, Aug. 26-30, 2019, Prague, Czech Republic, 13 pages.

Notice of Reasons for Rejection for Japanese Patent Application No. 2023-537922, mailed Jul. 30, 2024, 7 pages.

Minn, et al., "An Investigation into Time-Domain Approach for OFDM Channel Estimation," IEEE Transactions on Broadcasting, vol. 46, Issue 4, Dec. 2000, pp. 240-248.

Qualcomm Incorporated, "R1-2009255: Discussion on SRS enhancement," 3GPP TSG-RAN WG1 Meeting #103-e, Oct. 26-Nov. 13, 2020, Electronic Meeting, 31 pages.

Song, et al., "Comb Type Pilot Aided Channel Estimation in OFDM Systems With Transmit Diversity," IEEE Transactions on Broadcasting, vol. 52, Issue 1, Mar. 2006, pp. 50-57.

Extended European Search Report for European Patent Application No. 20967139.5, mailed Aug. 19, 2024, 9 pages.

* cited by examiner

METHOD AND TRANSCEIVER OF A WIRELESS COMMUNICATION NETWORK FOR HANDLING REFERENCE SIGNALS

This application is a 35 U.S.C. § 371 national phase filing of International Application No. PCT/SE2020/051256, filed Dec. 22, 2020, the disclosure of which is incorporated herein by reference in its entirety.

TECHNICAL FIELD

The present disclosure relates generally to methods and transceivers of a wireless communication network for handling reference signals. The present disclosure further relates to computer programs and carriers corresponding to the above methods and transceivers.

BACKGROUND

To meet the huge demand for higher bandwidth, higher data rates and higher network capacity, due to e.g. data centric applications, existing $4^{th}$ Generation (4G) wireless communication network technology, aka Long Term Evolution (LTE) is being enhanced into a $5^{th}$ Generation (5G) technology, also called New Radio (NR) access. The following are some requirements for the 5G wireless communication networks:

- Data rates of several tens of megabits per second should be supported for tens of thousands of wireless devices;
- 1 gigabit per second is to be offered simultaneously to tens of persons on the same office floor;
- Several hundreds of thousands of simultaneous connections is to be supported for massive sensor deployments;
- Spectral efficiency should be significantly enhanced compared to 4G;
- Coverage should be improved;
- Signaling efficiency should be enhanced; and
- Latency should be reduced significantly compared to 4G.

Multiple Input Multiple Output (MIMO) is a method for multiplying the data carrying capacity of a wireless link using multiple transmission and receiving antennas at the Radio Access Network (RAN) node, aka base station, and possibly also at the wireless device to exploit multipath propagation. For these reasons, MIMO is an integral part of the $3^{rd}$ generation (3G) and 4G wireless communication networks. 5G networks will also employ MIMO. The RAN node and possibly also the wireless device may have hundreds of antennas at the transmitter side and/or the receiver side. Typically with a $(N_t, N_r)$, where $N_t$ denotes the number of transmitter antennas and $N_r$ denotes the number of receiver antennas, the peak data rate multiplies with a factor of $N_t$ over single antenna systems in a rich scattering environment. Further, Multi-User MIMO (MU-MIMO) is a technique employed in 4G and 5G for being able to send signals to multiple wireless devices simultaneously over the same bandwidth.

Further, in order to enhance the transmission capacity, higher and higher frequencies are used. In 5G, the transmission frequencies are in multiple GHz. Also, the transmission bandwidth may be in the area of multiple GHz. The higher frequencies, the broader transmission bandwidth as well as the multiple transmitter and/or receiver antennas, increase drastically the amount of information that is needed to be handled in the RAN node, and possibly also in the wireless device.

In order to optimize performance in the transceiver, a frequency selective antenna combination is assumed. To enable this, each antenna branch of the transceiver has its own transceiver path between an aggregate unit and an antenna feed port at which the one or more antenna elements are connected. Typically, part of the functionality in the transceiver is split between different integrated circuits (IC), e.g., Application Specific Integrated Circuits (ASIC). A possible such split is between the aggregate unit and a radio ASIC, which handles one or more of the antenna branches. Taking the pre-requisite of large number of antennas, high frequency and high bandwidth into consideration, the amount of information needed to be sent over interfaces between such ICs needs to be very high. Consequently, the communication capacity of such interfaces needs to be very high. Thus, there is a need to reduce the information needed to be sent over such interfaces.

Further, to use the degree of freedom given by a large number of antennas, information of a wireless communication channel between the RAN node and the wireless device(s) that are to communicate simultaneously is needed. Such information may be called channel state information (CSI). CSI may be obtained from e.g. measurements on signals received at each of the multiple receiver antennas of the RAN node from the wireless device(s), exploiting reciprocity of the wireless communication channel. Given an accurate CSI, transmit and receive weights can be accurately determined and used for directed transmission to the wireless device(s). Consequently, there is a need for a solution for reducing information needed to be sent over an interface within a transceiver, such as a RAN node or a wireless device. Especially, there is a need for a solution for reducing information of a wireless communication channel, such as CSI, needed to be sent over such an interface. In other words, there is a need for a solution to obtain wideband CSI in an efficient manner. Still further, CSI is especially important in the MU-MIMO case to determine which wireless devices to combine and how to beamform to minimize crosstalk.

SUMMARY

It is an object of the invention to address at least some of the problems and issues outlined above. It is possible to achieve these objects and others by using methods, network nodes and wireless communication devices as defined in the attached independent claims.

According to one aspect, a method for handling reference signals is provided, which is performed by a first transceiver of a wireless communication network. The first transceiver comprises M antenna branches, M being at least two, each antenna branch comprising an antenna element. The method comprises receiving, from a second transceiver of the wireless communication network, at the antenna elements of each of the M antenna branches and in time domain, an OFDM modulated wideband reference signal comprising an OFDM reference signal symbol mapped to every K subcarrier frequency of at least a subset of a carrier frequency bandwidth, K being called comb factor, and at each of the M antenna branches, sampling the received wideband reference signal using N samples per OFDM symbol. The method further comprises, for each of the M antenna branches, accumulating the received, sampled wideband reference signal over at least two repetition blocks, each block having a length of N/K samples, to obtain a condensed signal with the length N/K samples, based on information on start time of the at least two repetition blocks, and for each of the M antenna branches, conveying the condensed signal over an interface to an aggregate unit use in estimating a wireless communication channel between the second transceiver and the first transceiver.

According to another aspect, a first transceiver is provided, which is operable in a wireless communication system and configured for handling reference signals. The first transceiver comprises M antenna branches, M being at least two, each antenna branch comprising an antenna element. The first transceiver further comprises a processing circuitry and a memory. The memory contains instructions executable by said processing circuitry, whereby first transceiver is operative for receiving, from a second transceiver of the wireless communication network, at the antenna elements of each of the M antenna branches and in time domain, an OFDM modulated wideband reference signal comprising an OFDM reference signal symbol mapped to every K subcarrier frequency of at least a subset of a carrier frequency bandwidth, K being called comb factor, and, at each of the M antenna branches, sampling the received wideband reference signal using N samples per OFDM symbol, The first transceiver is further operative for, for each of the M antenna branches, accumulating the received, sampled wideband reference signal over at least two repetition blocks, each block having a length of N/K samples, to obtain a condensed signal with the length N/K samples, based on information on start times of the at least two repetition blocks, and, for each of the M antenna branches, conveying the condensed signal over an interface to an aggregate unit for use in estimating a wireless communication channel between the second transceiver and the first transceiver.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
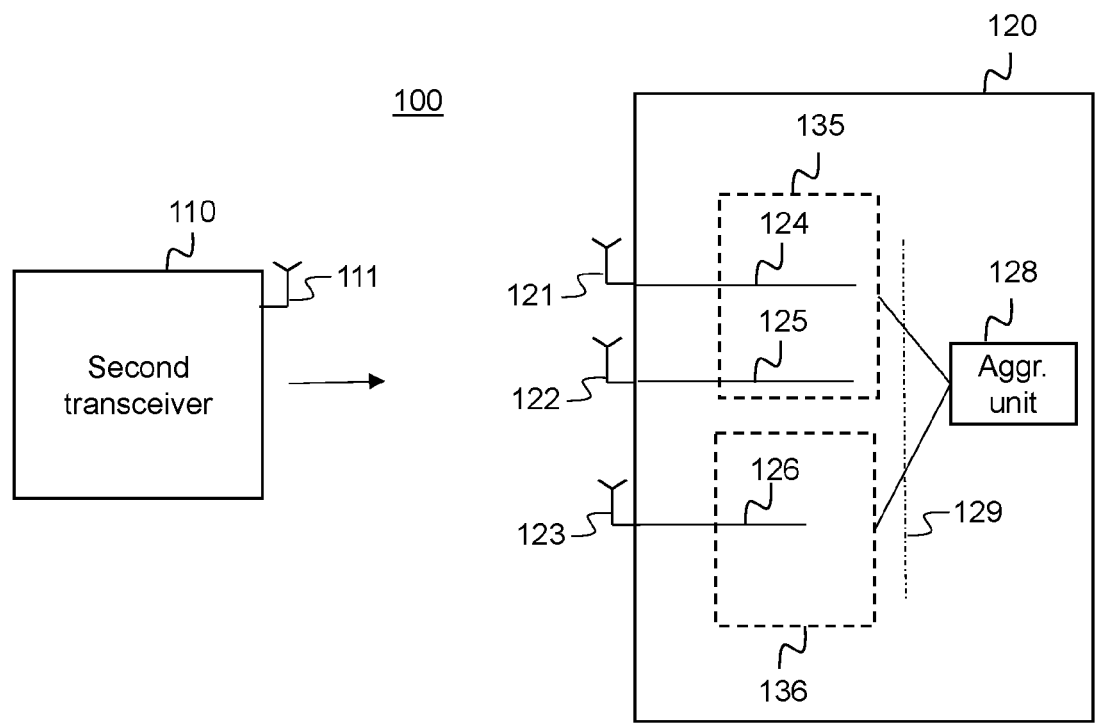
FIG. 1 is a schematic block diagram of a wireless communication network in which the present invention may be used.

FIG. 1 shows a wireless communication network 100 in which the present invention may be used. The wireless communication network comprises a second transceiver 110 that is in communication with, or adapted for wireless communication with a first transceiver 120. The second transceiver 110 has at least one antenna 111 through which wireless signals are sent and received. The first transceiver 120 has a plurality of antenna elements 121, 122, 123 through which the first transceiver 120 can receive wireless signals transmitted by the second transceiver 110. The first transceiver 120 may also transmit signals towards the second transceiver 110 via the plurality of antenna elements, or via other not shown antenna elements. The first transceiver 120 further has a plurality of antenna branches 124, 125, 126. Each antenna branch is connected to at least one of the plurality of antenna elements 121, 122, 123. The antenna elements are only connected to one antenna branch. The antenna elements of different branches 124, 125, 126 are individually steerable. However, in case there are more than one antenna element on one antenna branch, those antenna elements on the same branch may not be mutually individually steerable. The first transceiver 120 further comprises an aggregate unit 128 to which the plurality of antenna branches 124, 125, 126 leads. When the second transceiver 110 transmits an analog time-domain signal, such as a reference signal from its antenna 111, the signal is received at each of the plurality of antenna elements 121, 122, 123 of the first transceiver 120. The analog time-domain signal arriving at each antenna elements is fed from the antenna element into the respective antenna branch where it is treated, as will be shown further below. Thereafter the signal of each antenna branch is conveyed to the common aggregate unit 128 in which further treatment is performed, such as a transformation from time domain into frequency domain of the combined signal. When then signals are conveyed from the plurality of antenna branches 124, 125, 126 and into the aggregate unit 128, they are sent over an interface 129, which may be an interface between separate ICs of the first transceiver 120. Further, according to an embodiment, the first transceiver 120 comprises two or more ICs 135, 136. One or more of the antenna branches are combined in one IC. In the example of FIG. 1 antenna branches 124, 125 are combined in a first IC 135 and antenna branch 126 lies on a second IC 136. The first and second ICs 135, 136 are then connected to the aggregate unit 128 over the interface 129.

Figure 2:
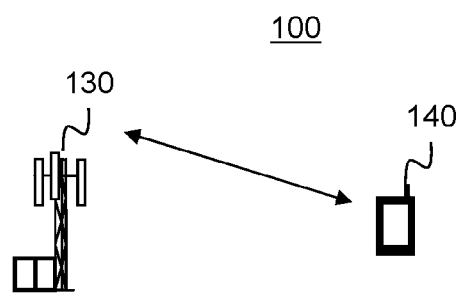
FIG. 2 is another schematic diagram of a wireless communication network in which the present invention may be used.

FIG. 2 shows an example of a wireless communication network 100 in which the present invention may be used. The network 100 comprises a radio access network node 130 that is in, or is adapted for, wireless communication with a wireless communication device 140. The second transceiver 110 of FIG. 1 may be the radio access network node 130 and the first transceiver 120 of FIG. 1 may be the wireless communication device 140. Alternatively, the second transceiver 110 of FIG. 1 may be the wireless communication device 140 and the first transceiver 120 may be the radio access network node 130.

The wireless communication network 100 of FIGS. 1 and 2 may be any kind of wireless communication network that can handle Orthogonal Frequency Division Multiplexing (OFDM) modulated signals and provide radio access to wireless devices. Example of such wireless communication networks are Long Term Evolution (LTE), LTE Advanced, Wireless Local Area Networks (WLAN), $5^{th}$ generation wireless communication networks based on technology such as New Radio (NR), and any possible future $6^{th}$ Generation wireless communication networks.

The RAN node 130 may be any kind of network node that provides wireless access to a wireless device 140 alone or in combination with another network node. Examples of radio access network nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a remote radio unit (RRU), a remote radio head (RRH) and a multi-standard BS (MSR BS).

The wireless device 140 may be any type of device capable of wirelessly communicating with a RAN node 130 using radio signals. For example, the wireless device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 3:
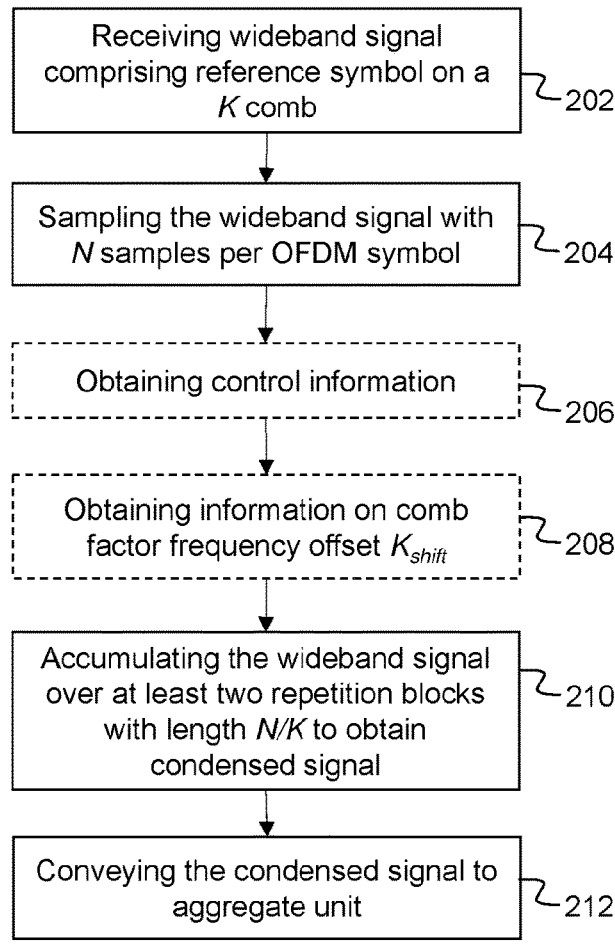
FIG. 3 is a flow chart illustrating a method performed by a first transceiver, according to possible embodiments.

FIG. 3, in conjunction with FIG. 1, describes a method performed by a first transceiver 120 of a wireless communication network 100, for handling reference signals. The first transceiver 120 comprises M antenna branches 124, 125, 126, M being at least two, each antenna branch comprising an antenna element 121, 122, 123. The method comprises receiving 202, from a second transceiver 110 of the wireless communication network, at the antenna elements 121, 122, 123 of each of the M antenna branches 124, 125, 126 and in time domain, an OFDM modulated wideband reference signal comprising an OFDM reference signal symbol mapped to every K subcarrier frequency of at least a subset of a carrier frequency bandwidth, K being called comb factor, and at each of the M antenna branches 124, 125, 126, sampling 204 the received wideband reference signal using N samples per OFDM symbol. The method further comprises, for each of the M antenna branches 124, 125, 126, accumulating 210 the received, sampled wideband reference signal over at least two repetition blocks, each block having a length of N/K samples, to obtain a condensed signal with the length N/K samples, based on information on start time of the at least two repetition blocks, and for each of the M antenna branches 124, 125, 126, conveying 212 the condensed signal over an interface 129 to an aggregate unit 128 for use in estimating a wireless communication channel between the second transceiver 110 and the first transceiver 120.

The first transceiver 120 may be a part of a RAN node 130. In this case, the second transceiver 110 is part of a wireless device 140. Alternatively, the first transceiver 120 is part of a wireless device 140. In this case, the second transceiver 110 is part of a RAN node 130. An "antenna branch" 124, 125, 126 is a signal branch, i.e. a current-conducting wire or wires. The antenna element 121, 122, 123 (or elements) connected to one end of one antenna branch wirelessly receives an analog radio signal transmitted by the second transceiver. The antenna branches are electrically arranged in parallel. The analog radio signal received at the antenna element of each branch may be treated differently on the different antenna branches. An "antenna element" is the part of the antenna from which signals are sent and received. There may be only one antenna element per antenna branch, or there may be more than one antenna element in one branch, for example a sub-array of antenna elements. The antenna branches are individually controllable. That is, the antenna elements of different antenna branches are individually controllable, whereas in case there are more than one antenna element in the same antenna branch, those antenna elements of the same antenna branch are not necessarily individually controllable. This means that it is possible to control an antenna element of one antenna branch in a different way than an antenna element of another antenna branch.

A reference signal symbol is a complex scalar. A reference signal comprises a plurality of reference signal symbols which are complex scalars. The reference signal symbols are mapped to the K subcarriers so that e.g. a first reference signal symbol is mapped to subcarrier 0, a second reference signal symbol is mapped to subcarrier K−1, a third is mapped to subcarrier 2K−1 etc. Alternatively, there may be a frequency offset so that e.g. the first reference signal symbol is mapped to subcarrier 1, the second reference signal symbol is mapped to subcarrier K etc, this is called comb offset. The wideband reference signal mapped with the reference signal symbols is OFDM modulated and transformed from frequency domain to time domain before it is sent from the second transceiver. The wideband reference signal ranges in frequency over the at least subset of the carrier frequency bandwidth. The subset comprises A subcarrier frequencies. In every K of those A subcarrier frequencies, a reference signal symbol is mapped. The reference signal symbol may be the same symbol or different symbols mapped to the different subcarrier frequencies. When sending reference signal symbols OFDM modulated over each K subcarrier frequency (called K comb), the received wideband reference signal becomes repetitive with a length of N/K samples. The wideband reference signal is repetitive in that the signal sent by the second transceiver is repeated with a length of N/K samples. That is, over one OFDM symbol the signal is repeated so that the same reference signal symbol is sent K times. When the wirelessly transmitted signal is received at the antenna elements of the first transceiver, noise and interference has been added. By accumulating two or more such repetition blocks, the noise and interference can be suppressed as noise and interference are different for different repetition blocks whereas the signal looks the same for the repetition blocks.

"Accumulating the signal over at least two of the repetition blocks" may for example be to add the signal of the at least two repetition blocks to each other over the same sample, i.e. sample 1 of repetition block 1 to sample 1 of repetition block 2 etc., and take the average value at each time point. In case the reference signal symbol is not on the first subcarrier in the repetition block window, i.e. in case there is a comb offset, the phase may need to be adapted so that the two repetition blocks are comparable, i.e. sample 1 of repetition block 1 can be added to sample 1 of repetition block 2. Comb offset is well known and described in 3GPP standard NR 38.211 SRS physical signal. As the second transceiver and the first transceiver of a wireless communication network are synchronized and as the reference signal symbols are known by both the second transceiver and the first transceiver, the first transceiver may already have, or either receives, information of when the OFDM symbols are sent and received, and thereby the start time of the repetition blocks.

An "aggregate unit" is a unit of the first transceiver in which a plurality of antenna branches meet so that signals from the plurality of antenna branches can be combined into one and the same branch. "For use in estimating the wireless communication channel", which "use" is performed in the aggregate unit, may comprise to transform the condensed signal from time domain into frequency domain, by e.g. a Fast Fourier Transform (FFT), and estimate the communication channel based on the transformed condensed signal. The estimation of the communication channel can then be used by the first transceiver for determining communication characteristics for the first transceiver transmitting towards the second transceiver, such as beamforming weights. The channel estimate may be an estimate of the communication channel between the second transceiver and the M antennas of the first transceiver based on the fast Fourier transformed condensed signal. The sampling 204, accumulating 210 and conveying 212 may be performed in a part of the first transceiver 120 that may be called a radio unit or radio ASIC.

When mapping a reference signal symbol to each K subcarrier frequency, the wideband reference signal sent by the second transceiver becomes repetitive within an OFDM symbol with a length (N/K). As there are reference symbols spread out over a whole frequency range of at least a subset of the carrier bandwidth, the repetitive part contains the information necessary to determine the channel, as long as there is at least one reference symbol per coherence bandwidth. Further, as the parts are repetitive, they contain the same signal. The only difference between the repetitive parts at the first transceiver is that they are added with noise and interference that looks different for the different repetitive parts. Thereby, when accumulating a plurality of such repetitive parts, the noise and interference can be suppressed, and the accumulated signal would become better over the whole channel than only one repetitive part. Further, the more repetitive parts that are accumulated, the better the accumulated signal. Further, as the amount of information of the condensed signal is much lower than for the whole signal before condensation, the communication resources of the interface can be widely limited when sending only the condensed signal over the interface to the aggregate unit compared to sending the whole signal. At the same time, the repetitive signal comprises enough information for estimating the communication channel. In fact, it has turned out that no information is lost with such a condensed signal. Further, as the condensed signal is much smaller than the whole signal, the computation resources in the aggregate unit can be limited a lot compared to when the whole signal is to be handled in the aggregate unit.

According to an embodiment, the OFDM reference signal symbol is a part of a sounding reference signal (SRS), and the comb factor K=4. The reference signal symbol can be seen as a complex scalar in the SRS. To transmit an SRS signal with comb factor 4 from a UE is supported in 3GPP 38.211 Release 15, chapter 6.4.1.4 "Sounding Reference Signal". Consequently, the described method can be implemented on a received SRS with K=4 without needing any standardization modifications.

According to another embodiment, the OFDM reference signal symbol is a part of a sounding reference signal (SRS), and the comb factor K=6, 8, 12 or 16. Tests have shown that the method works well also for higher K-factors than the one used in the standard today, i.e. K=4. Higher K-factors means more sparse insertion of reference signals, frequency-wise, which means less data to transmit compared to K=4 and therefore sparing of transmission and data resources. Further, higher K-factor means more repetition blocks over one OFDM symbol as the repetition blocks have length N/K More repetition blocks imply that a statistically better average value of the wireless channel can be achieved, i.e. lower noise and interference. Further, the length N/K of the condensed signal becomes shorter with higher K and thus the bandwidth over the interface to the aggregate unit can be lowered even more. Also, with a higher K, more wireless devices can be multiplexed on the communication channel, by giving them different time shifts. At least theoretically, K=8 signifies that 8 wireless devices can be multiplexed. However, when the number of wireless devices increases, the bandwidth needed over the interface also increases.

According to another embodiment, the received wideband reference signal is sampled 204 with a sampling frequency $f_s$. Further, the comb factor K and the sampling frequency $f_s$ are selected so that the at least two repetition blocks each comprises an equal number of samples. Hereby, the accumulating of the at least two repetition blocks will become much easier, i.e. less complex, compared to if an uneven quantity of samples are to be compared. According to another embodiment, each of the at least two repetition blocks are an integer number of samples.

According to yet another embodiment, when the at least two repetition blocks comprises a first repetition block in a first OFDM symbol and a second repetition block in a second OFDM symbol, the accumulation 210 is compensated for a cyclic prefix of the first or second OFDM symbol so that the shift in time between the first and the second repetition block is an integer number of samples. In some cases, the accumulation 210 is performed for repetition blocks that belongs to more than one OFDM symbol. This means that the accumulation is performed over an OFDM symbol border between two OFDM symbols so that at least one repetition block belongs to one OFDM symbol and at least one other repetition block belongs to another OFDM symbol. When such accumulation is performed, the cyclic prefix existing at the end and/or beginning of an OFDM symbol has to be taken into consideration. This is especially of interest when the sampling frequency is selected compared to the wireless communication network base time so that the cyclic prefix becomes a real value instead of an integer value. Then a compensation is needed so that the duration between the first and second repetition block, originally mainly or only being due to the CP, becomes an integer number of samples.

According to another embodiment, the at least two repetition blocks comprises a first set of repetition blocks in a first OFDM symbol and a second set of repetition blocks in a second OFDM symbol. Further, the accumulation 210 is performed so that firstly the first set of repetition blocks are accumulated, and if a time between the first and the second OFDM symbol is not an integer number of samples, a fractional delay filter is applied to the second set of repetition blocks to align them with the first set of repetition blocks and thereafter the second set of repetition blocks are accumulated with the first set of repetition blocks. In other words, the second set of repetition blocks are aligned in time with the first set of repetition blocks before the second set of repetition blocks are accumulated to the already accumulated first set of repetition blocks, see also step 308 of FIG. 4. This is an advantageous way of doing the cyclic prefix compensation discussed above in case the distance in time between the first and second OFDM symbol is not an integer number of samples.

According to another embodiment, the method further comprises obtaining 206 the information on start times of the at least two repetition blocks, the information on start times comprising the N number of samples per OFDM symbol, the comb factor K and OFDM symbol start time. This control information is then used to find the start times of each of the at least two repetition blocks, in case the start times are not already known to the first transceiver. The control information may be obtained by the first transmitter from another unit of the node such as the aggregate unit, or from another node. In case the accumulation is performed in two or more OFDM symbols, the OFDM symbol start time includes start times for each OFDM symbol included in the accumulation.

According to yet another embodiment, the method further comprises obtaining 208 information on a comb factor frequency offset $K_{shift}$, when the OFDM reference signal symbol is not mapped on a lowest subcarrier of the at least subset of the carrier frequency bandwidth, and when performing the accumulation 210, compensating for the comb factor frequency offset $K_{shift}$. The comb factor frequency offset, aka comb offset, can be compensated for by de-rotating the comb factor frequency offset. In other words, the compensation is performed by a per sample phase shift before the accumulation. The information on comb factor frequency offset may be the actual offset or it may be the per sample phase shift. The offset may refer to the phase shift to apply, in e.g. a look-up table in the first transceiver.

According to embodiments, the inventive solution comprises of one or more of the following steps:

Configuring the second transceiver to transmit a reference signal on a regular K-comb over the complete, or a subset of the system bandwidth, over at least a part of L OFDM symbols, where L may be an integer of at least 1 and K is the comb factor;

At the first transceiver, receiving a time domain reference signal at a first set of $M_{rx}$ antenna branches. $M_{rx}$ stands for M receiver antenna branches, where M is at least two. The antenna branches may have individual antenna elements, or a combination obtained using linear receive beamforming;

At each of the antenna branches, sampling the time domain signal using $N_{rx}$ samples per OFDM symbol;

Configuring the receive circuitry of the first transceiver, i.e. circuitry of the antenna branches, with information relating to start and length of repetition blocks;

Summing the received, sampled time domain signal for each of the $M_{rx}$ antennas over repetition blocks to obtain a condensed signal or length $$\frac{N_{rx}}{K};$$

Conveying the condensed signal over an internal interface to an aggregate unit; and Using, at the aggregate unit, the condensed signal for estimating a wireless communication channel between the second transceiver and the first transceiver, i.e. for precoder generation, and/or scheduling.

In the following, the steps mentioned above will be described in more detail. First, the second transceiver, which may be a wireless device, is configured to transmit a reference signal X(k), which may be an SRS or a Demodulation Reference Signal (DMRS), on a K-comb, aka comb factor K. This means that the reference signal r is mapped to every K subcarrier, perhaps with a with a given comb factor frequency offset $K_{shift}$.

$X(k)=r(\bar{k}), k=K\bar{k}+K_{shift}$

X(k)=0, for k not fulfilling the equation above, where k=subcarrier index. The second transceiver will then perform OFDM modulation and obtain a wideband reference signal in time domain x(n), which is wirelessly transmitted:

$$x(n) = \alpha \sum_k X(k)e^{jnk\frac{2\pi}{N}} = \alpha \sum_k r(\bar{k})e^{j(K\bar{k}+K_{shift})n\frac{2\pi}{N}} = \alpha e^{jK_{shift}n\frac{2\pi}{N}} \sum_k r(\bar{k})e^{j\bar{k}nK\frac{2\pi}{N}}$$

Clearly, we have;

$$x(n + N/K) = x(n)e^{jK_{shift}\frac{2\pi}{K}}$$

This is a well-known property of the Discrete Fourier Transform (DFT). Observe that any cyclic prefix addition etc. is not included here.

Thereafter, the first transceiver receives the transmitted wideband time domain reference signal at its antenna elements connected to $M_{rx}$ antenna branches. At each of the antenna branches, the wideband time domain signal is sampled using $N_{rx}$ samples per OFDM symbol. The received sampled signal on antenna m is denoted by $$y_m(n)$$

Then the receive circuitry of the first transceiver is configured with information relating to start and length of repetition blocks. Duration of the repetition block is typically $N_{rx}/K$ aka N/K samples. Starting point $n_b$ for repetition block b is typically $$n_b = \begin{cases} n_{b-1} + \frac{N_{rx}}{K}, & \text{if block } b \text{ and } b-1 \text{ in same symbol} \\ n_{b-1} + \frac{N_{rx}}{K} + N_{rx}^{CP}, & \text{if blocks } b \text{ and } b-1 \text{ in different symbols, } N_t^{CP} \text{ is } CP \text{ duration} \end{cases}$$

where $n_0$ is given by the OFDM symbol position of the first sampled OFDM symbol in the sample stream, which can be derived from frame synch.

Further, the received signal for each of the $M_{rx}$ antenna ports is summed over repetition blocks to obtain a condensed signal $c_m$ of length N/K, which is mathematically described according to the following $$c_m(n) = \sum_b e^{-j(b \bmod K)K_{shift}\frac{2\pi}{K}} y_m(n + n_b)$$

Potentially, a linear transformation may be applied of the signals of the antenna branches, either to the condensed signal "c" or to the sampled signal "y", mapping from $M_{rx}$ to $M_{rx}^{WB}$ streams, where WB stands for wideband. The mapping may be performed by creating $M_{rx}^{WB}$ virtual antenna branches by a linear combination of the streams from at least some of the $M_{rx}$ antenna branches. By having fewer such virtual antenna branches than actual antenna branches, an additional reduction of the wideband requirement on the interface towards the aggregate unit is achieved.

Thereafter, the condensed signal is conveyed over the internal interface to an aggregate unit. The condensed signal may be buffered and transmitted with some delay to make best use of the internal interfaces. It may for examples be transmitted in downlink (DL) slots, or when a possible narrowband receiver is not used.

Further, the condensed signal is used by the aggregate unit for estimating the wireless channel and further for e.g. precoder generation, and or scheduling. This may involve the condensed signal $c_m(n)$ being transformed into frequency domain using e.g. an FFT. Then the channel estimate $\hat{h}_m^k$ may be formed using the condensed signal $c_m$ transformed into frequency domain. This may involve a matched filtering step, and transform processing, using e.g. a discrete cosine transform over subcarriers, and a beamspace transformation, defining the channel estimate as a selected subset of the transformed raw channel information. The channel estimate may be used to perform one or more of the following: Determine a scheduling bandwidth for a wireless device, in DL or uplink (UL); Determine precoders for DL transmission, including for Multi-User Multiple Input Multiple Output (MU-MIMO) transmission; Determine a frequency selective spatially fully sampled interference measure; Determine receive weights for an UL reception, which weights may be e.g. one or more Grid of Beams (GoB) or DFT beams, i.e. DFT-based linear phase front precoder; Determine which wireless devices to co-schedule in a slot, and determine which wireless devices that can be spatially multiplexed.

According to an embodiment, the transmitted reference signal is an SRS with comb K=4. According to another embodiment, the transmitted reference signal is an SRS with comb K=8, or K=6, or K=16, or K=12.

According to another embodiment, to avoid complex implementation solutions, it may be of interest to have the same number of samples in each KL repetition block, i.e. in each K block of each L OFDM symbols. Then the comb factor needs to be matched with the sampling frequency. New Radio (NR) standard subcarrier bandwidth is $BW_{sc}=2^\mu*15$ kHz where $\mu=0 \ldots 4$ and relates to numerology. NR base timing assumes 2048 time samples per symbol. All frame structure events, such as symbol start, cyclic prefix etc. takes place on time based on this time quantization. The actual implementation might deviate from this sample rate based on reasons like total communication bandwidth, cost balance between high sample rate and minimum needed sample rate being the bandwidth of the information signal. It is natural to select a sampling frequency $f_s=N_{samp}*3.84$ MHz since 3.84 MHz and 15 kHz has a power of two relationship. Further, number of samples per symbol is $$N_{samp}^{symb} = \frac{f_s}{BW_{sc}} = \frac{N_{samp}*2^8}{2^\mu}$$

As one example assume 100 MHz carrier bandwidth and 120 kHz numerology ($\mu=3$). One possibility is then to select $N_{samp}$ as a power of two factor and take the lowest sampling frequency above the minimum frequency 100 MHz. This means selecting:

$$N_{samp}=2^5=32 => f_s=122.88 \text{ MHz}$$

$$N_{samp}^{symb}=2^{10}=1024$$

This states that the comb factor K has to be selected as a power of two $K=2^\alpha$. This will give a power of two number of samples in each repetition block. Another choice is to select a lower number of $N_{samp}$ to minimize overhead of sampling rate Selecting:

$$N_{samp}=30=2*3*5 => f_s=115.2 \text{ MHz}$$

$$N_{samp}^{symb}=3*5*2^6=960$$

opens up for a comb factor also to include factors 3 and 5. One interesting choice is to select K=12 giving one sounding subcarrier per resource block. NR standard today limits the factor to K∈{2, 4,8}. Proposal is to allow $K=2^\alpha*3^\gamma \leq 32$ Where the upper limit is set by coherence bandwidth in radio channels.

In some cases, repetition blocks of different OFDM symbols may be accumulated, i.e. summed. In those cases, cyclic prefixes (CP) used in between symbols, i.e. between a first and a consecutive second symbol, need to be taken into account when determining where a repetition block of the second symbol starts. Note that the length of the CP is an integer number of the NR base sample time but the number of samples of the CP varies over the slot. If the second transceiver has selected another sampling frequency than the NR base sample time, e.g. the 115.2 MHz choice mentioned earlier, then the length of each CP measured in number of samples might be a real number instead of an integer. This then has to be compensated for prior to accumulating repetition blocks from different symbols. A proposed embodiment is to select a symbol starting time that compensates for an integer part of the CP for each symbol. The accumulated result for the symbol is then compensated for the fractional sample prior to accumulation between symbols. One possible way to implement this is to apply a fractional delay filter, which is shown in FIG. 4 and described below.

Figure 4:
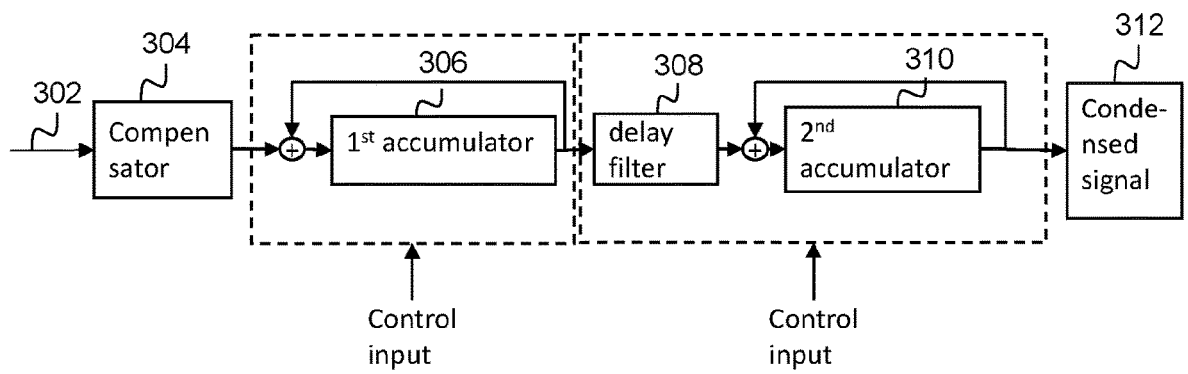
FIG. 4 is a block diagram illustrating handling of a reference signal in an antenna branch, according to further possible embodiments.

In the following, with reference to FIG. 4, is a description of a hardware realization of embodiments of the present invention. As before, a transceiver is described comprising a set of antenna branches each connected to at least one antenna element, all antenna elements being arranged in e.g., an array. A typical application has number of antenna elements in the order of 100. Communication bandwidth is also typically several hundred of MHz. As a consequence, the total amount of information to and from the antenna branches to an aggregate unit is very high. This may be costly both in terms of power and manufacturing cost.

FIG. 4 describes a possible implementation of one single (receiver) antenna branch of the first transceiver 120, in the following called a sparse sounding receiver block 300. Each antenna branch will or may have a similar implementation. An assumption is that the radio architecture enables access to digitized signals received from all antennas branches or at least enough antenna branches to identify the radio channel. Input to the sparse sounding receive block 300 is a digitized, i.e., sampled, and channel filtered signal, hereinafter called a sampled reference signal 302. The sampled reference signal is fed to a frequency offset compensator 304 that, in case there is a comb factor frequency offset $K_{shift}$, de-rotates the potential frequency offset. The potentially de-rotated sampled reference signal is then fed to a first accumulator 306 that accumulates repetition blocks within an OFDM symbol, either all repetition blocks within the symbol or a defined amount or certain blocks. Control information for performing the accumulation is symbol start time quantified to sample rate, the comb factor K and numerology, which states the number of samples per symbol. The accumulated signal is called a condensed signal. The condensed signal has length N/K. After accumulation within a symbol in the first accumulator 306, and in case accumulation is to be performed for more than one OFDM symbol, that is over an OFDM symbol border, the condensed signal is fed to a fractional delay filter 308. This delay filter compensates the signal for the fractional sample part of the symbol start, e.g. for the part of CP that is not an integer number of samples. This enables accumulation between symbols. Such an accumulation is then performed in a second accumulator 310, after the delay filter 308 compensation. Control input to the delay filter 308 and the second accumulator 310 is the number of OFDM symbols over which accumulation is to be performed, Cyclic Prefix fraction and numerology, i.e., number of samples per symbol. Finally, a received sounding sequence, aka condensed signal 312 is delivered. Information content of the condensed signal 312 has the same number of samples as a repetition block, i.e. N/K. Accumulations give a processing gain in the signal quality proportional to the total number of repeated repetition blocks.

The inventors have found out that the presented implementation has many parts in common with a proposed hardware needed to perform an efficient mutual coupling antenna calibration as presented in International patent application WO2020/043310 of the same applicant. In the document, a quite different invention is present, which deals with performing efficient antenna calibration. Part of the document is a presentation of one possible hardware block to receive the calibration signal. The proposed calibration signal is very similar to a sparse sounding signal hence one embodiment of the present invention is to use a hardware block designed to both receive antenna calibration signals as well as sparse sounding signals, using the hardware block of WO2020/043310 but added with some feature to also handle the inventive sparse sounding signal.

Figure 5:
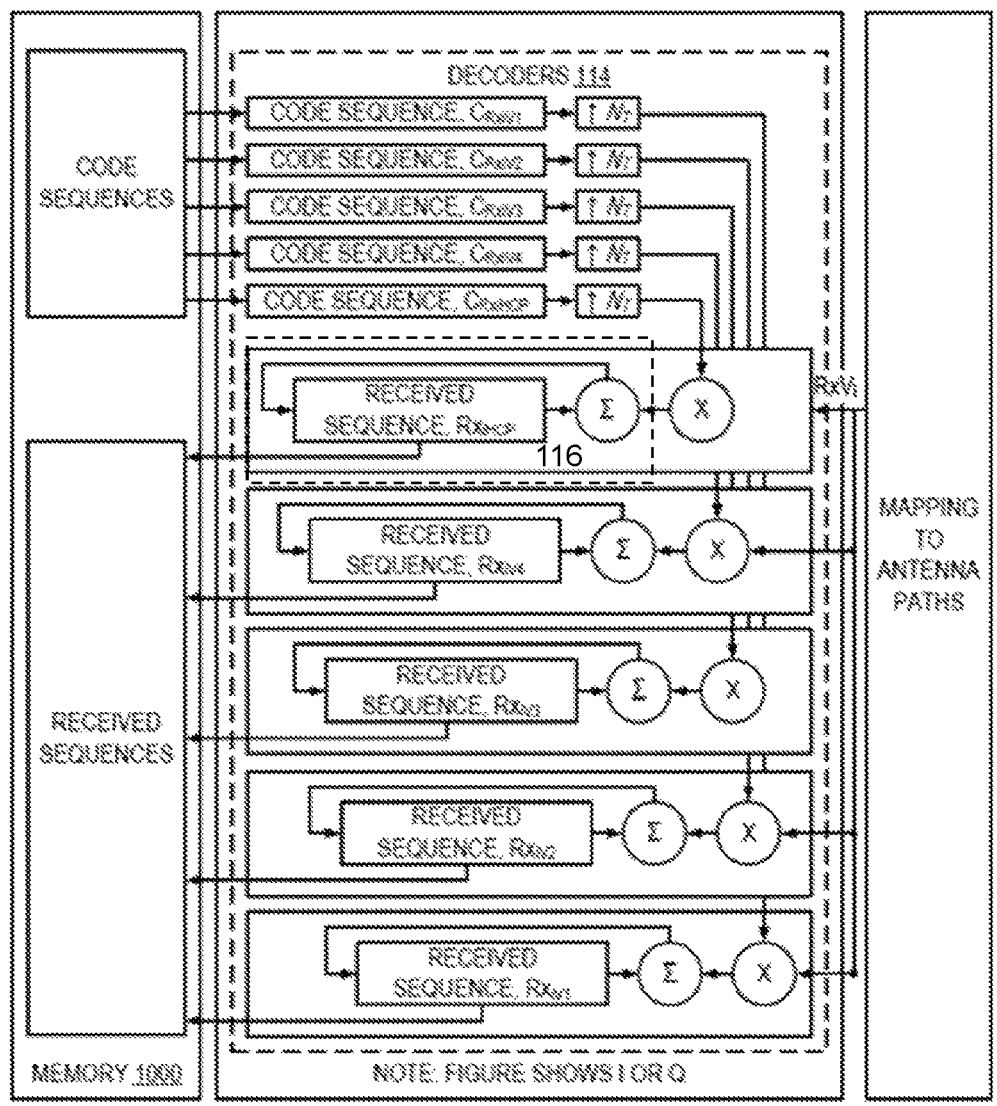
FIG. 5 is a block diagram of a prior art antenna calibration signal unit that may be used in connection with embodiments of the present invention.

The hardware block of WO2020/043310 is presented in FIG. 5. FIG. 5 shows principles of reception of antenna calibration signals. Note that FIG. 5 shows a set of receive branches, see "RxV$_i$". In the antenna calibration case, a code sequence is multiplied to the signal of each antenna branch. The code multiplication is not used for the inventive sparse sounding but the parallel blocks marked 116 can be used for handling also the sounding signals as presented above. In other words, the inventors have found out that by merging the decoder part 114 of FIG. 5 with the sparse sounding receiver block of FIG. 4, a common hardware block for both functions, i.e. antenna calibration and sparse sounding reference signal handling, has been achieved. Compared to FIG. 4, the block 116 of FIG. 5 comprises the first accumulator 306, the delay filter 308 and the second accumulator 310, wherein the delay filter 308 and the second accumulator 310 are used when accumulation is performed over two or more OFDM symbols.

Figure 6:
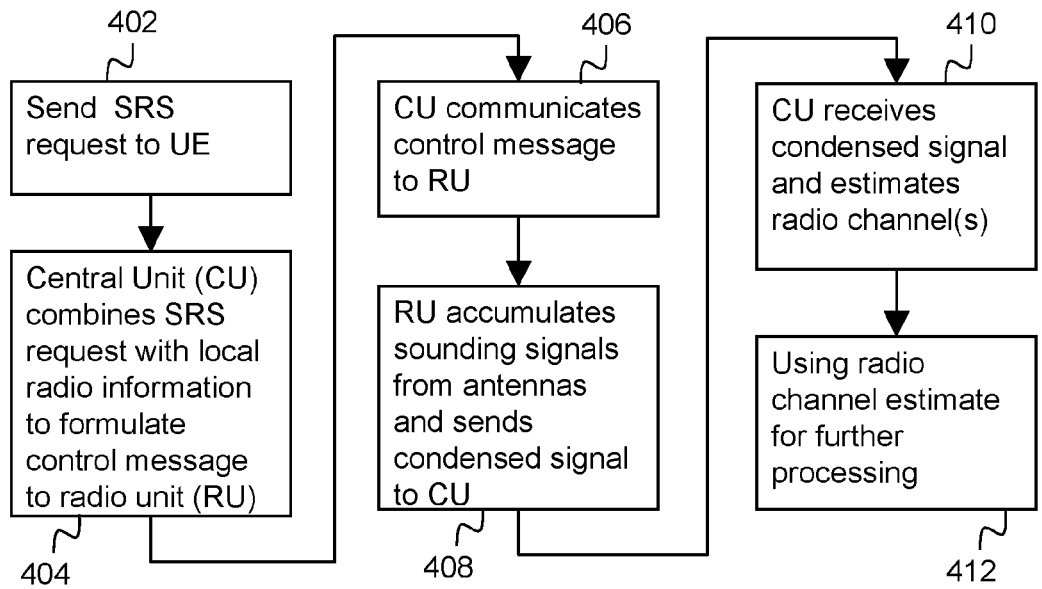
FIG. 6 is a flow chart illustrating a method for handling SRS in a wireless communication network, according to possible embodiments.

FIG. 6 shows a flow chart of control signaling within a transceiver, according to an embodiment, when the transceiver is implemented in a base station exemplified by a gNodeB. First, the gNodeB sends 402 a reference signal request e.g. an SRS request, to one or more UEs. The SRS request comprises an index to parameters such as time to transmit the SRS, comb factor K, comb factor frequency offset $K_{shift}$, wherein $K_{shift}=0$ means no offset, information to determine the SRS sequence, etc. A central unit of the gNodeB, which may be the aggregate unit 128 of FIG. 1, then combines 404 the SRS request with local radio information to formulate a control message to a radio unit of the gNodeB, i.e. the antenna branches. The control message to the radio unit comprises information indicating start time of each repetition block, such as integer and fraction part when to start symbol reception, comb factor K, comb factor frequency offset $K_{shift}$, $N_r$ of samples per repetition block, N/K, or number of samples per OFDM symbol N. The central unit communicates 406 the control message to the Radio unit, which is on one or more integrated circuits, e.g. ASICs separate from the central unit. The radio unit performs the following 408: sets up SRS receivers, once or for each slot having an SRS, receives the sounding signals sent by the one or more UEs, and accumulates sounding signals from the antennas, according to described embodiments, and sends the resulting condensed signal to the central unit. The central unit receives 410 the condensed signal from the radio unit and estimates the radio channel(s) between the gNodeB and the one or more UE based on the condensed signal, i.e. the accumulated sounding signal. The radio channel estimate is then used 412 for further processing at the central unit.

Figure 7:
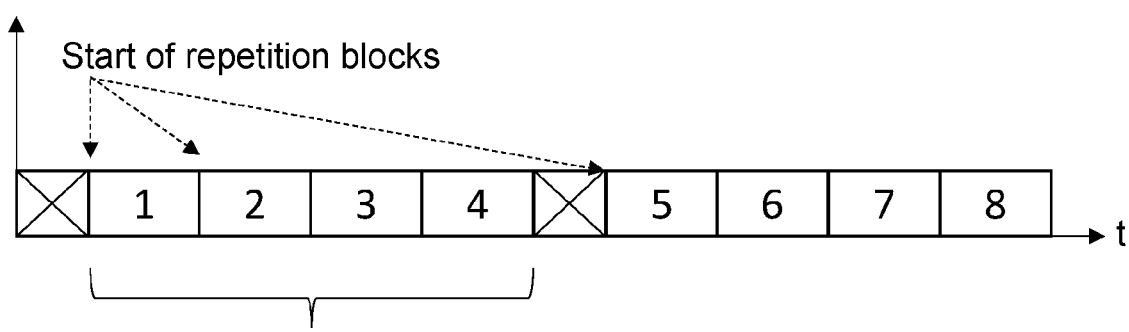
FIG. 7 is a schematic diagram of a time domain signal.

FIG. 7 shows an example of a wideband reference signal as it looks in time-domain when transmitted from the second transceiver 110 or received by the first transceiver 120 when an OFDM reference signal symbol is mapped to every K subcarrier frequency. In this example K=4, which means that there will be 4 repetition blocks within one OFDM symbol, as each repetition block has a length of N/K samples. The part of the signal marked with X signifies the cyclic prefix. The repetition blocks are marked with numbers. Repetition blocks 1-4 belong to a first OFDM symbol and repetition blocks 5-8 belongs to a second OFDM symbol.

Figure 8:
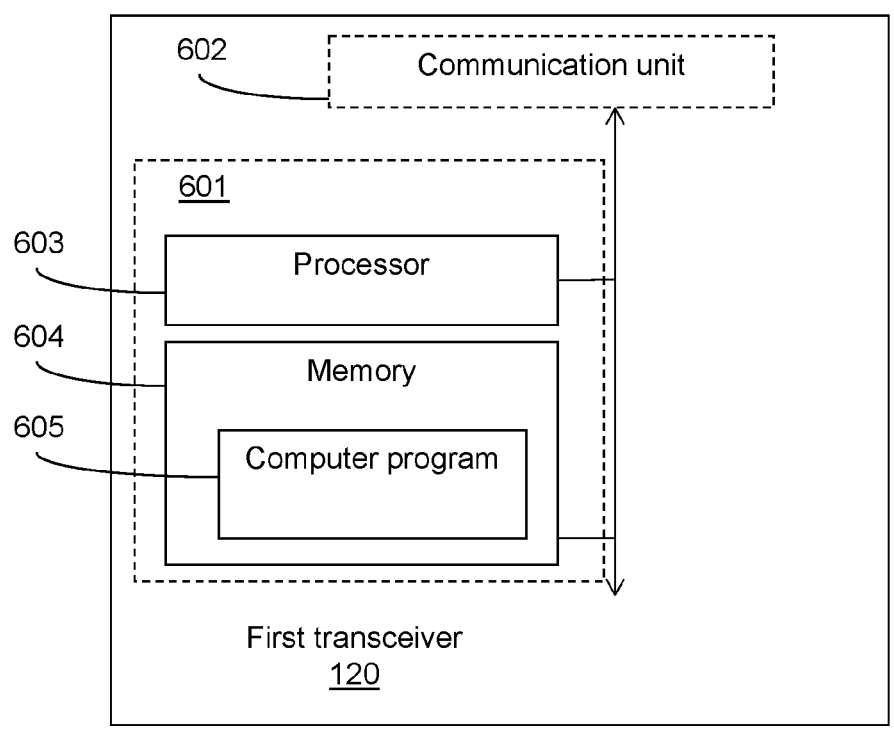
FIG. 8 is a schematic block diagram of a first transceiver, according to further possible embodiments.

FIG. 8, in conjunction with FIG. 1, describes a first transceiver 120 operable in a wireless communication system 100 configured for handling reference signals. The first transceiver 120 comprises M antenna branches 124, 125, 126, M being at least two, each antenna branch comprising an antenna element 121, 122, 123. The first transceiver 120 further comprises a processing circuitry 603 and a memory 604. The memory contains instructions executable by said processing circuitry, whereby first transceiver 120 is operative for receiving, from a second transceiver 110 of the wireless communication network, at the antenna elements of each of the M antenna branches 124, 125, 126 and in time domain, an OFDM modulated wideband reference signal comprising an OFDM reference signal symbol mapped to every K subcarrier frequency of at least a subset of a carrier frequency bandwidth, K being called comb factor, and, at each of the M antenna branches 124, 125, 126, sampling the received wideband reference signal using N samples per OFDM symbol, The first transceiver 120 is further operative for, for each of the M antenna branches 124, 125, 126, accumulating the received, sampled wideband reference signal over at least two repetition blocks, each block having a length of N/K samples, to obtain a condensed signal with the length N/K samples, based on information on start times of the at least two repetition blocks, and, for each of the M antenna branches 124, 125, 126) conveying the condensed signal over an interface 129 to an aggregate unit 128 for use in estimating a wireless communication channel between the second transceiver 110 and the first transceiver 120.

According to an embodiment, the OFDM reference signal symbol is a part of a sounding reference signal, SRS, and the comb factor K=4. According to another embodiment the OFDM reference signal symbol is a part of an SRS, and the comb factor K=6, 8, 12 or 16.

According to another embodiment, the first transceiver 120 is operative for the sampling of the received wideband reference signal with a sampling frequency $f_s$, and wherein the comb factor K and the sampling frequency $f_s$ are selected so that the at least two repetition blocks each comprises an equal number of samples.

According to another embodiment, the at least two repetition blocks comprise a first repetition block in a first OFDM symbol and a second repetition block in a second OFDM symbol. Further, the first transceiver is operative for, in the accumulation, compensating for a cyclic prefix of the first or second OFDM symbol so that a shift in time between the first and the second repetition block is an integer number of samples.

According to yet another embodiment, the at least two repetition blocks comprises a first set of repetition blocks in a first OFDM symbol and a second set of repetition blocks in a second OFDM symbol. Further, the first transceiver is operative for performing the accumulation so that firstly the first set of repetition blocks are accumulated, and if a time between the first and the second OFDM symbol is not an integer number of samples, a fractional delay filter is applied to the second set of repetition blocks to align them with the first set of repetition blocks and thereafter the second set of repetition blocks are accumulated with the first set of repetition blocks.

According to yet another embodiment, the first transceiver 120 is further operative for obtaining the information on start times of the at least two repetition blocks, the information on start times comprising the N number of samples per OFDM symbol, the comb factor K and OFDM symbol start time.

According to yet another embodiment, the first transceiver 120 is further operative for obtaining information on a comb factor frequency offset $K_{shift}$, when the OFDM reference signal symbol is not mapped on a lowest subcarrier of the at least subset of the carrier frequency bandwidth, and when performing the accumulation, compensating for the comb factor frequency offset $K_{shift}$.

According to other embodiments, first transceiver 120 may further comprise a communication unit 602, which may be considered to comprise conventional means for wireless communication with the second transceiver 110. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the first transceiver 120 to perform the steps described in any of the described embodiments of the first transceiver 120 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the first transceiver 120 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a first transceiver of a wireless communication network, for handling reference signals, the first transceiver comprising M antenna branches, M being at least two, each antenna branch comprising an antenna element, the method comprising:

receiving, from a second transceiver of the wireless communication network, at the antenna elements of each of the M antenna branches and in time domain, an Orthogonal Frequency Division Multiplexing (OFDM) modulated wideband reference signal comprising an OFDM reference signal symbol mapped to every K subcarrier frequency, wherein K is equal to or greater than 1, of at least a subset of a carrier frequency bandwidth, K being called comb factor;

at each of the M antenna branches, sampling the received OFDM modulated wideband reference signal using N samples per OFDM symbol, wherein N is equal to or greater than 1;

for each of the M antenna branches, accumulating the received, sampled OFDM modulated wideband reference signal over at least two repetition blocks, each block having a length of N/K samples, to obtain a condensed signal with the length N/K samples, based on information on start times of the at least two repetition blocks, for each of the M antenna branches, conveying the condensed signal over an interface to an aggregate unit for use in estimating a wireless communication channel between the second transceiver and the first transceiver.

2. The method according to claim 1, wherein the OFDM reference signal symbol is a part of a sounding reference signal, SRS, and the comb factor K=4.

3. The method according to claim 1, wherein the OFDM reference signal symbol is a part of a sounding reference signal, SRS, and the comb factor K=6, 8, 12 or 16.

4. The method according to claim 1, wherein the received OFDM modulated wideband reference signal is sampled with a sampling frequency $f_s$, and wherein the comb factor K and the sampling frequency $f_s$ are selected so that the at least two repetition blocks each comprises an equal number of samples.

5. The method according to claim 1, wherein when the at least two repetition blocks comprises: a first repetition block in a first OFDM symbol and a second repetition block in a second OFDM symbol, the accumulation is compensated for a cyclic prefix of the first or second OFDM symbol so that a shift in time between the first repetition block and the second repetition block is an integer number of samples.

6. The method according to claim 1, wherein the at least two repetition blocks comprises: a first set of repetition blocks in a first OFDM symbol and a second set of repetition blocks in a second OFDM symbol, the accumulation being performed so that firstly the first set of repetition blocks are accumulated, and if a time between the first OFDM symbol and the second OFDM symbol is not an integer number of samples, a fractional delay filter is applied to the second set of repetition blocks to align them with the first set of repetition blocks and thereafter the second set of repetition blocks are accumulated with the first set of repetition blocks.

7. The method according to claim 1, further comprising:
obtaining the information on start times of the at least two repetition blocks, the information on start times comprising the N number of samples per OFDM symbol, the comb factor K and OFDM symbol start time.

8. The method according to claim 1, further comprising:
obtaining information on a comb factor frequency offset $K_{shift}$, when the OFDM reference signal symbol is not mapped on a lowest subcarrier of the at least subset of the carrier frequency bandwidth, and
when performing the accumulation, compensating for the comb factor frequency offset $K_{shift}$.

9. A first transceiver operable in a wireless communication system configured for handling reference signals, the first transceiver comprising M antenna branches, M being at least two, each antenna branch comprising an antenna element, the first transceiver comprising a processing circuitry and a memory, said memory containing instructions executable by said processing circuitry, whereby first transceiver is operative for:
receiving, from a second transceiver of the wireless communication system, at the antenna elements of each of the M antenna branches and in time domain, an Orthogonal Frequency Division Multiplexing (OFDM) modulated wideband reference signal comprising an OFDM reference signal symbol mapped to every K subcarrier frequency, wherein K is equal to or greater than 1, of at least a subset of a carrier frequency bandwidth, K being called comb factor;
at each of the M antenna branches, sampling the received OFDM modulated wideband reference signal using N samples per OFDM symbol, wherein N is equal to or greater than 1;
for each of the M antenna branches, accumulating the received, sampled OFDM modulated wideband reference signal over at least two repetition blocks, each block having a length of N/K samples, to obtain a condensed signal with the length N/K samples, based on information on start times of the at least two repetition blocks,
for each of the M antenna branches, conveying the condensed signal over an interface to an aggregate unit for use in estimating a wireless communication channel between the second transceiver and the first transceiver.

10. The first transceiver according to claim 9, wherein the OFDM reference signal symbol is a part of a sounding reference signal, SRS, and the comb factor K=4.

11. The first transceiver according to claim 9, wherein the OFDM reference signal symbol is a part of a sounding reference signal, SRS, and the comb factor K=6, 8, 12 or 16.

12. The first transceiver according to claim 9, operative for the sampling of the received OFDM modulated wideband reference signal with a sampling frequency $f_s$, and wherein the comb factor K and the sampling frequency $f_s$ are selected so that the at least two repetition blocks each comprises an equal number of samples.

13. The first transceiver according to claim 9, wherein the at least two repetition blocks comprises: a first repetition block in a first OFDM symbol and a second repetition block in a second OFDM symbol, and the first transceiver is operative for, in the accumulation, compensating for a cyclic prefix of the first or second OFDM symbol so that a shift in time between the first repetition block and the second repetition block is an integer number of samples.

14. The first transceiver according to claim 9, wherein the at least two repetition blocks comprises: a first set of repetition blocks in a first OFDM symbol and a second set of repetition blocks in a second OFDM symbol, and the first transceiver is operative for performing the accumulation so that firstly the first set of repetition blocks are accumulated, and if a time between the first OFDM symbol and the second OFDM symbol is not an integer number of samples, a fractional delay filter is applied to the second set of repetition blocks to align them with the first set of repetition blocks and thereafter the second set of repetition blocks are accumulated with the first set of repetition blocks.

15. The first transceiver according to claim 9, further being operative for:
obtaining the information on start times of the at least two repetition blocks, the information on start times comprising the N number of samples per OFDM symbol, the comb factor K and OFDM symbol start time.

16. The first transceiver according to claim 9, further being operative for:
obtaining information on a comb factor frequency offset $K_{shift}$, when the OFDM reference signal symbol is not mapped on a lowest subcarrier of the at least subset of the carrier frequency bandwidth, and
when performing the accumulation, compensating for the comb factor frequency offset $K_{shift}$.

17. A non-transitory computer readable medium comprising instructions, which, when executed by at least one processing circuitry of a first transceiver of a wireless communication network, configured for handling reference signals, the first transceiver comprising M antenna branches, M being at least two, each antenna branch comprising an antenna element, causes the first transceiver to:
receive, from a second transceiver of the wireless communication network, at the antenna elements of each of the M antenna branches and in time domain, an Orthogonal Frequency Division Multiplexing (OFDM) modulated wideband reference signal comprising an OFDM reference signal symbol mapped to every K subcarrier frequency, wherein K is equal to or greater than 1, of at least a subset of a carrier frequency bandwidth, K being called comb factor;
at each of the M antenna branches, sample the received OFDM modulated wideband reference signal using N samples per OFDM symbol, wherein N is equal to or greater than 1;
for each of the M antenna branches, accumulate the received, sampled OFDM modulated wideband reference signal over at least two repetition blocks, each block having a length of N/K samples, to obtain a condensed signal with the length N/K samples, based on information on start times of the at least two repetition blocks, for each of the M antenna branches, convey the condensed signal over an interface to an aggregate unit for use in estimating a wireless communication channel between the second transceiver and the first transceiver.

\* \* \* \* \*

UNITED STATES PATENT AND TRADEMARK OFFICE
CERTIFICATE OF CORRECTION

PATENT NO. : 12,250,164 B2  
APPLICATION NO. : 18/267558  
DATED : March 11, 2025  
INVENTOR(S) : Werner et al.

Page 1 of 2

It is certified that error appears in the above-identified patent and that said Letters Patent is hereby corrected as shown below:

In the Specification

In Column 2, Line 37, delete "MU-M IMO" and insert -- MU-MIMO --, therefor.

In Column 3, Line 21, delete "symbol, The" and insert -- symbol. The --, therefor.

In Column 4, Line 33, delete "then" and insert -- the --, therefor.

In Column 5, Line 15, delete "equipped" and insert -- equipment --, therefor.

In Column 6, Line 13, delete "etc," and insert -- etc., --, therefor.

In Column 7, Line 58, delete "N/K" and insert -- N/K. --, therefor.

In Column 9, Line 46, delete "or" and insert -- of --, therefor.

In Column 9, Line 65, delete "with a with a" and insert -- with a --, therefor.

In Column 10, Line 56, delete "applied of" and insert -- applied to --, therefor.

In Column 11, Line 2, delete "examples" and insert -- example --, therefor.

In Column 11, Line 7, delete "and or" and insert -- and/or --, therefor.

In Column 12, Line 3, delete "rate" and insert -- rate. --, therefor.

In Column 12, Line 3, delete "Selecting:" and insert the same at Line 4, as a new point.

In Column 12, Line 11, delete "K$\in$ {2, 4,8}." and insert -- K$\in${2,4,8}. --, therefor.

Signed and Sealed this  
Sixteenth Day of September, 2025

Coke Morgan Stewart  
*Acting Director of the United States Patent and Trademark Office*

In Column 12, Line 12, delete "Where" and insert -- where --, therefor.

In Column 12, Line 51, delete "antennas branches" and insert -- antenna branches --, therefor.

In Column 12, Line 62, delete "or certain" and insert -- of certain --, therefor.

In Column 14, Line 46, delete "symbol, The" and insert -- symbol. The --, therefor.

In Column 14, Line 53, delete "126)" and insert -- 126 --, therefor.

In Column 15, Line 60, delete "(Electrical" and insert -- (Electrically --, therefor.